United States Patent [19]
Hollins

[11] 3,782,492
[45] Jan. 1, 1974

[54] MOTORIZED RETRACTABLE PADDED CUSHION

[76] Inventor: Jesse R. Hollins, 1 Chester Dr., Great Neck, N.Y. 11021

[22] Filed: Oct. 15, 1971

[21] Appl. No.: 189,650

[52] U.S. Cl............................ 180/82 C, 280/150 B
[51] Int. Cl............................................. B60r 21/10
[58] Field of Search.............. 280/150 B; 180/82 R, 180/82 C, 111, 112, 113, 114, 103; 340/64, 52 D; 296/84 K

[56] References Cited
UNITED STATES PATENTS

| | | | |
|---|---|---|---|
| 2,743,942 | 5/1956 | Walters | 280/150 B |
| 2,576,816 | 11/1951 | Wahlberg | 180/112 |
| 3,613,819 | 10/1971 | Maloney | 280/150 SB X |
| 3,634,697 | 1/1972 | MacFarlane | 340/64 X |
| 3,343,623 | 9/1967 | Porter | 180/82 C |
| 3,637,037 | 1/1972 | Doland et al. | 180/114 |
| 3,387,259 | 6/1968 | Oliva | 180/82 R |
| 3,653,714 | 3/1972 | Gentile | 180/82 C X |
| 3,441,103 | 4/1969 | Lymar | 180/82 R |

Primary Examiner—Leo Friaglia
Assistant Examiner—David M. Mitchell
Attorney—Morris Kirschstein et al.

[57] ABSTRACT

An assembly for protecting a passenger of a vehicle. The assembly includes a padded cushion and electrically activated means coupled to the cushion for moving the cushion toward a desired position and retracting the cushion from that position. The electrically activated means includes a motor gear meshed to a threaded shaft. The activated means also includes a threaded nut mechanically engaging the threaded shaft, which nut is attached to the frame of the cushion. Electric circuits are provided for activating the motor so as to turn the shaft in one direction causing the cushion to move to an extended horizontal position, and to turn the shaft in the opposite direction causing the cushion to retract from the extended horizontal position.

5 Claims, 7 Drawing Figures

PATENTED JAN 1 1974 3,782,492

INVENTOR.
JESSE R. HOLLINS

INVENTOR.
JESSE R. HOLLINS

MOTORIZED RETRACTABLE PADDED CUSHION

CROSS REFERENCE TO RELATED APPLICATIONS

This invention relates to my co-pending U.S. Pat. application Ser. No. 187,286, filed on Oct. 7, 1971 for An Assembly for Protecting A Passenger Of A Vehicle.

BACKGROUND OF THE INVENTION

1. Field of the Invention

This invention relates to an assembly for protecting an occupant of a vehicle and particularly to a motorized padded cushion coupled to a motorized train.

2. Description of the Prior Art

The most frequently used means for protecting the occupant of a vehicle is a seat belt. Unfortunately, most vehicle occupants tend to neglect to fasten their seat belt, thus the seat belt does not always render protective service.

To compensate for the lack of use of the current seat belts, the installation of air bags in vehicles is being considered. The air bag is supposed to be designed so that it will inflate immediately upon the sensing of a predetermined force of impact upon the vehicle. As the air bag inflates to its material size, its position should be between the occupant of the vehicle and the instrument panel and windshield area. The speed and force with which the gas must fill the bag creates a sound so loud that permanent damage to the occupant's eardrums may occur, especially if the windows of the vehicle are closed. The sudden impact of the inflated bag on the occupant's body, especially his head, can result in severe physical damage to him. Timing the inflation of the bag prior to the movement of the occupant during the momentary period of the accident is unpredictable and uncontrollable thus its safety value is questionable. There is no assurance that the bag will not unnecessarily inflate when there is merely a sharp and sudden jolt of the vehicle, which often happens when the vehicle's wheels encounter a hole (pothole) in the roadway. Sudden deceleration and stopping of the vehicle is often necessary in order to prevent an accident, which deceleration or stopping causes the occupant to be thrown forward from his seated position and since there is no vehicle impact, the air bag does not inflate, thus it does not protect the occupant. Since the air bag and its triggering mechanism remain dormant unless the vehicle is involved in a severe accident, there is no assurance that the air bag mechanism will function when needed. As the air bag mechanism cannot be tested upon being installed, and periodic testing cannot be made, there is no positive assurance that the air bag system will ever function. The installation of an air bag, its triggering and inflating mechanism are costly to produce and install, even when the installation is made during the assembly of the vehicle. Once the air bag is inflated, its life being ended and the gas in the cylinder having escaped, a new bag and a fully charged cylinder are required necessitating their installation and connection in order to re-establish the air bag system. At present, air bag installation is considered only for protection of the passenger occupant of the front seat of the vehicle.

A solution to the above described problems has been suggested in my co-pending application, U.S. Pat. application Ser. No. 187,286, filed on Oct. 7, 1971 wherein my co-pending application describes a padded cushion which is hinge mounted to the instrument panel. The padded cushion in my co-pending application is manually movable from its vertical to its horizontal position, and vice versa.

SUMMARY OF THE INVENTION

1. Purpose of the Invention

It is an object of this invention to provide an effective and a convenient system for protecting the occupant of a vehicle.

It is another object of this invention to provide a simple and efficient assembly for protecting the occupant of a vehicle.

It is a further object of this invention to provide an electric motor controlled padded assembly.

It is still another object and feature of this invention to provide an ignition switch which will supply power to an electrical circuit through the "OFF" position of the switch, in addition to supplying power to other electrical circuits through other positions of the switch.

Other objects of the invention will in part be obvious and in part be pointed out thereinafter.

2. Brief Description of the Invention

According to a broad aspect of the invention, there is provided an assembly for protecting an occupant of a vehicle comprising a padded cushion, and electrically activated motorized means coupled to said cushion for moving said cushion toward an extended horizontal position and retracting said cushion from that position.

According to another aspect of the invention there is provided in combination, an ignition switch having "ON" and "OFF" positions, and an electrical circuit coupled to the "OFF" position of said switch. Although the "OFF" position of the switch has been altered to pass current to the electric circuit coupled thereto, and since it is normally referred to as the "OFF" position of the ignition switch, I will continue to refer to this position as the "OFF" position.

A feature of the invention provides that said electrically activating means includes a motor fastened to an abutment in the vehicle, said motor having a first and second terminal and a threaded shaft attached thereto, a threaded screw mechanically coupled to said shaft and to a threaded nut in the frame of said cushion, and electrical circuit means for activating said motor so as to turn said shaft in one direction to move said cushion to an extended horizontal position, and to turn said shaft in the opposite direction to retract said cushion from the extended horizontal position.

Another feature of the invention provides that said circuit means includes first and second limit switches, a first single pole switch having first and second contact positions, the pole of said first switch being coupled to a source of power, the first contact position being coupled through said first limit switch to a first terminal of said motor, the second contact position being coupled through said second limit switch to a second terminal of said motor, and means coupled to a frame of said cushion for opening said first and second switches, whereby when the pole is in the first contact position, the power source is coupled through said first limit switch to the first terminal of said motor so as to turn said shaft in said one direction until said cushion moves to the extended horizontal position so that said opening means disengages said first limit switch so as to deactivate said motor, and when the pole of said first switch is in the second contact position, the power source is coupled through said second limit switch to the second terminal of said motor to turn said shaft in the opposite direction until said cushion is retracted so that said opening means disengages said second limit switch and deactivates said motor.

Still another feature of the invention provides that said first single pole siwtch is an ignition switch for the vehicle, said first contact position is the "ON" position of said ignition switch, and the second contact position is the "OFF" position of said ignition switch.

A further feature of the invention further includes a second single pole switch having respective first and second contact positions, the pole of said second single pole switch being coupled to the first contact position of said first single pole switch, the first contact position of said second single pole switch being coupled through said first limit switch to the first terminal of said motor, and the second contact position of said second single pole switch being coupled through said second limit switch to the second terminal of said motor.

A still further feature of the invention provides that said second single pole switch is a spring loaded push button, so that when the pole of said second single pole switch is in the first contact position, the second contact position of said first single pole switch is electrically connected to said first limit switch, and when the pole of said second single pole switch is in the second contact position, the second contact position of said first single pole switch is electrically connected to said second limit switch.

BRIEF DESCRIPTION OF THE DRAWINGS

In the accompanying drawings in which are shown various possible embodiments of my invention.

DESCRIPTION OF THE PREFERRED EMBODIMENTS

Figure 1:
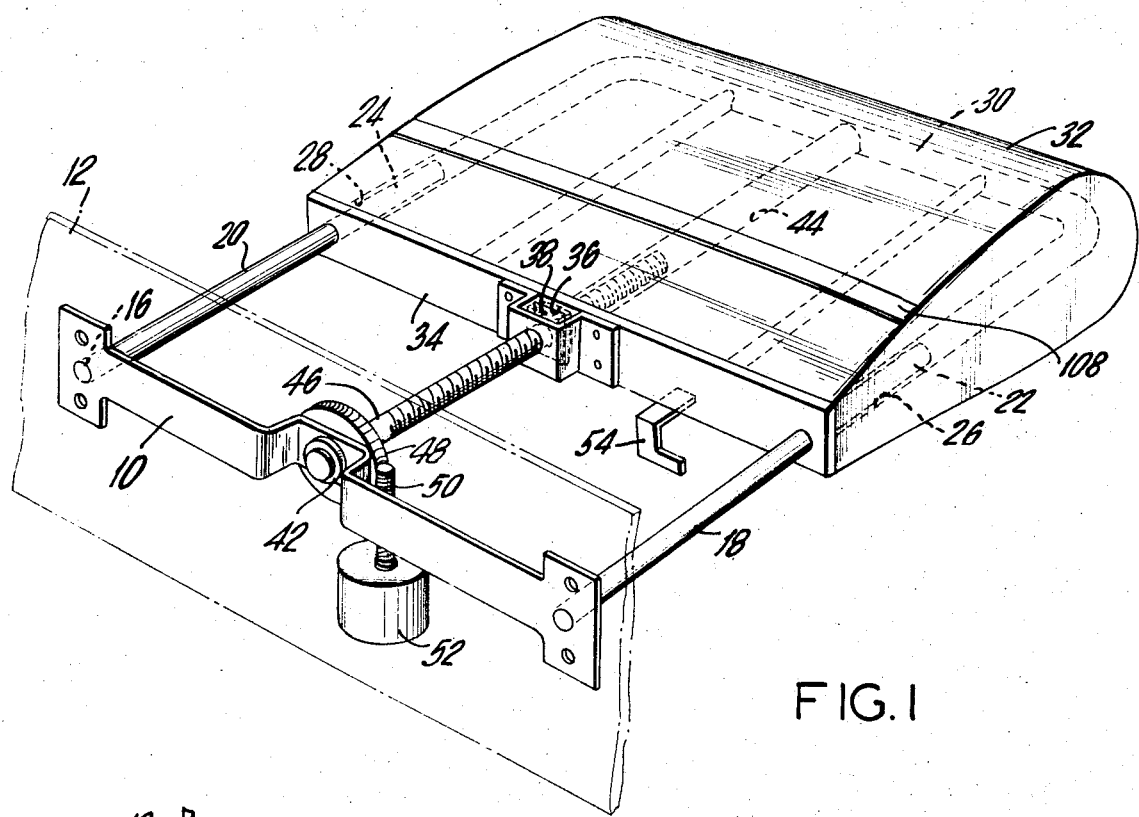
FIG. 1 is a perspective view of the automatically retractable cushion slide mounted to the fire wall of a vehicle.
Figure 2:
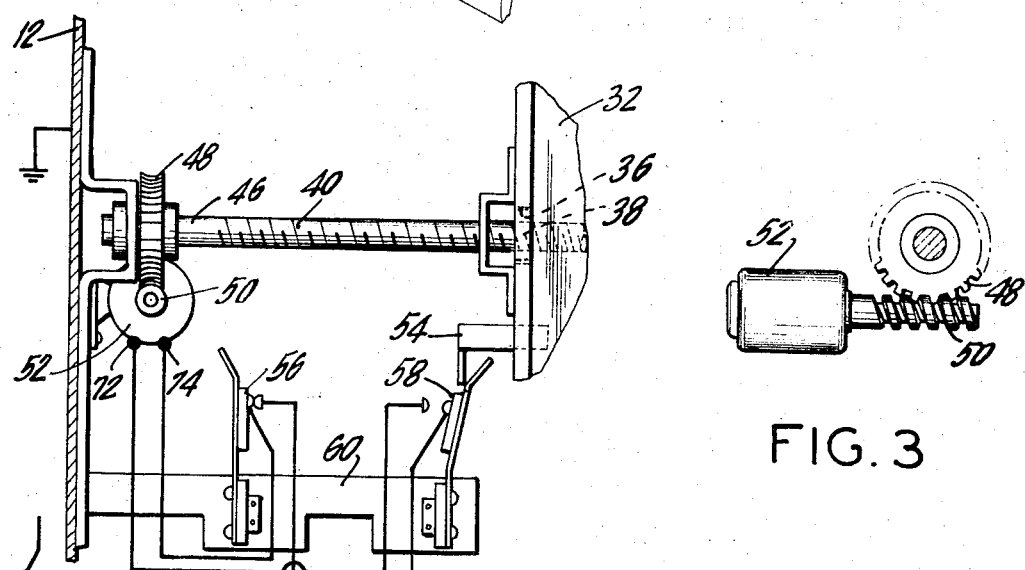
FIG. 2 shows the electrically activated and circuit means for advancing and retracting the cushion.
Figure 3:
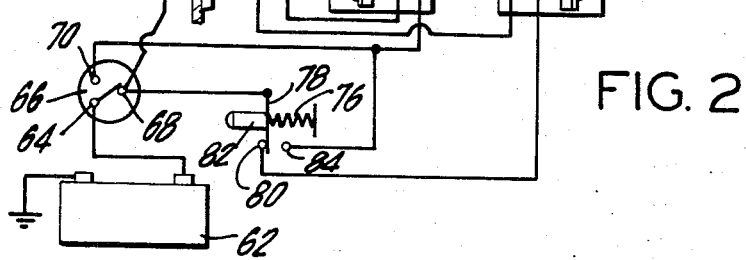
FIG. 3 is a side view of the means for coupling the motor drive shaft to the threaded screw, which screw is coupled to the padded cushion.

As shown in FIG. 1, support frame 10 is shown mounted to the fire wall 12 of a vehicular structure using a standard fastening means such as welding, bolting, or riveting. The vehicular structure can be an automobile, bus, airplane, train, etc. Respective ends 14 and 16 of tubular members 18 and 20 are also similarly fixed to the fire wall of the vehicle. The opposite respective ends of tubular members 18 and 20 are so dimensioned as to fit within the respective open ends 26 and 28 of tubular hollow framed structure 30, which structure is surrounded by suitable padded materials such as foam rubber, or other satisfactory material, wherein the foam rubber is covered with a suitable fabric, leather or plastic material to form padded cushion 32. Tubular structure 30 contains a rear reinforcing portion 34 which portion has a centrally located hollow recess 36. A floating nut 38 is positioned within recess 36 in such a manner as to allow a threaded screw 40 to pass therethrough without jamming, while at the same time, the recess lacks sufficient clearance to allow nut 39 to rotate. Threaded screw 40 is bearing fastened at 42 to frame 10, allowing the screw to rotate. Cushion 32 can provide either a hollow tube or clear area 44 into which the threaded screw can move. Securely attached to an unthreaded portion 46 of screw 40 is a gear 48. As shown in FIGS. 2 and 3, gear 48 is gear connected to a threaded drive shaft 50 of a motor 52. Motor 52 can be fastened to fire wall 12 or frame 10 via a suitable supporting bracket. Tubular members 18 and 20 are generally somewhat longer than threaded screw 40 so as to have the respective open ends 26 and 28 of structure 30 to telescopically engage respective members 18 and 20 when mounting cushion 32 to frame 10. Threaded screw 40 would thereafter then be initially screwed into floating nut 38 and positioned within clear area 44. A limit control switch plate 54 is mounted to rear reinforcing portion 34 of tubular structure 30.

As shown in FIG. 2, limit control switch plate 54 is positioned between a first limit switch 56 and a second limit switch 58, wherein limit switches 56 and 58 are fastened to frame 10, via a mounting bracket 60. Power is supplied to motor 52 from a battery 62. One terminal of battery 62 is grounded to the frame of the vehicle. Motor 52 is grounded when mounted to the fire wall 12 or the mounting frame 10. The other terminal of battery 62 is connected to a pole 64 of a single pole ignition switch 66 having a first contact 68 and a second contact 70. When pole 64 is electrically connected to first contact 68, ignition switch 66 is in the normally ignition "ON" position, and when pole 64 is electrically connected to second contact 70, ignition switch 66 is in the normally "OFF" position. First contact 68 is electrically coupled through limit switch 58 to a terminal 72 of motor 52 when limit switch 58 is closed, and second contact 70 is electrically coupled through limit switch 56 to a terminal 74 of motor 52 when limit switch 56 is closed.

A second single pole switch 76, having a first contact 78 and a second contact 80, is included within the circuit shown in FIG. 2, although switch 76 may be omitted. Switch 76 may be a standard single pole double throw switch, or as shown in this example, it can be a spring loaded push button tape switch. Pole 82 of switch 76 is directly connected to first contact 68 of ignition switch 66. Due to the spring bias of switch 76, pole 82 is normally positioned to be electrically connected to first contact 78, wherein first contact 78 is electrically connected to limit switch 58. When a push button 84 of switch 76 is depressed, pole 82 is electrically connected to second contact 80, wherein second contact 80 is electrically connected to limit switch 56.

Figure 4:
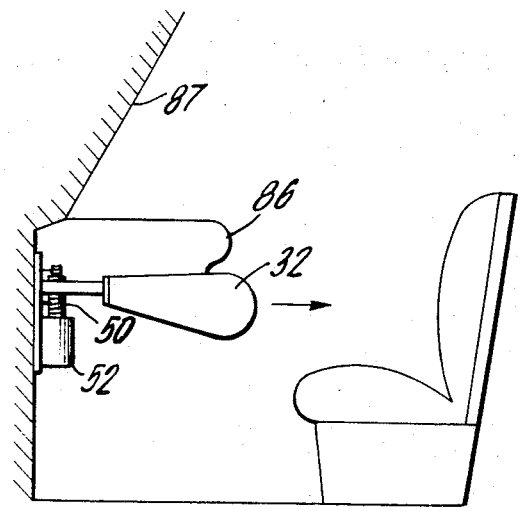
FIG. 4 is a side view of the padded cushion when retracted to a position beneath the instrument panel of a vehicle.

In the embodiment shown in FIGS. 1 to 3 as shown in FIG. 4, when the vehicle is not in operation, cushion 32 which is located adjacent the passenger's seat, is in the retracted position beneath instrument panel 86. A driver and passenger will thus enter a vehicle with the cushion in the retracted position. When the driver turns ignition switch 66 to the "ON" position, power is directly supplied to motor terminal 72 through limit switch 58 and to the ignition system. Threaded drive shaft 50 of motor 52 then turns in one direction, which rotation is translated to threaded screw 40 via coupling gear 48. Threaded screw 40 rotates in a direction which will force cushion 32 to move away from frame 10 until cushion 32 is in an extended horizontal position, at which time limit control switch plate 54, which is fastened to cushion 32, engages limit switch 58 in such a manner as to break its electrical connection, thereby deactivating motor 52.

When the driver turns the ignition switch to the "OFF" position turning off power to the ignition system, power is supplied through contact 70 (the "OFF" position) and limit switch 56 to terminal 74 of motor 52, so that drive shaft 50 now turns in the opposite direction and thus threaded screw 40 also turns in the opposite direction, so that cushion 32 now moves toward frame 10 until the cushion is in the final retracted position. The final retracted position is reached by having limit switch control plate 54 engage limit switch 56 so as to break its electrical connection, thereby deactivating motor 52 so as to stop the movement of cushion 32 relative to frame 10.

If a passenger desires to leave a vehicle while the ignition switch is still in the ignition "ON" position (the cushion being in the extended position), the driver will depress push button 84 of switch 76 so that power can be supplied through second contact 80 of switch 76 and limit switch 56 to terminal 74 of motor 52 until cushion 32 is retracted. Similarly, if a passenger is to enter the vehicle while the ignition switch is ignition "ON" and cushion 32 is fully extended, the driver again will depress push button 84 until the extended cushion is retracted and the passenger enters the vehicle. Once the passenger is seated, the driver can release push button 84 so that power is supplied through first contact 78 of switch 76 and limit switch 58 to terminal 72 of motor 52 until cushion 32 automatically reaches its extended horizontal position.

Figure 5:
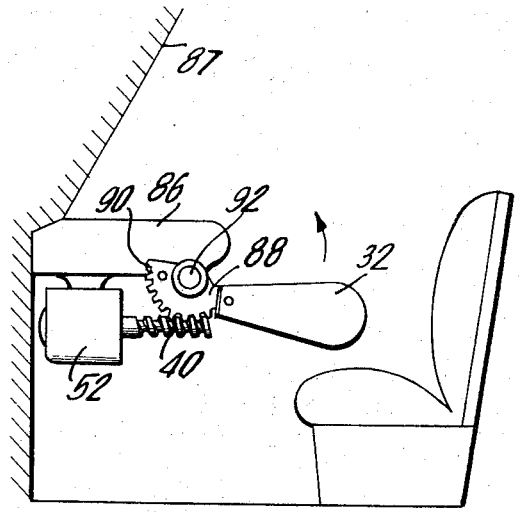
FIG. 5 is a side view of another embodiment of the invention wherein the cushion retracts to a vertical position.

FIG. 5 shows an alternate version of the cushion shown in FIG. 4. Contrary to the cushion in FIG. 4 where the cushion retracts beneath the instrument panel, the cushion in FIG. 5 retracts to a vertical position in front of the instrument panel 86 and windshield 87. In this example, cushion 32 is attached to a partially cylindrical member 88, which member has a gearing arrangement 90 located along the periphery thereof, wherein gear 90 meshes with threaded screw 40 so that when threaded screw 40 turns in one direction, gear 90 forces member 88 to rotate around its shaft 92 in such a manner as to position cushion 32 in its extended horizontal position, and likewise when the rotation of screw 40 is reversed, cushion 32 is retractably placed in the vertical position. The activating circuit, limit switches, and control switch plate, are the same as in the embodiment shown in FIG. 2 and are similarly positioned for suitable operation.

Figure 6:
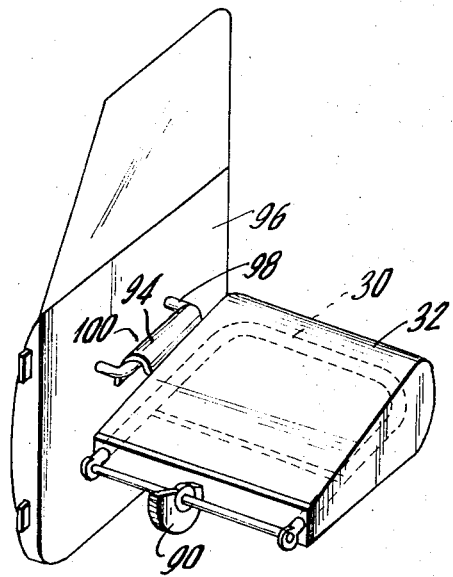
FIG. 6 is a perspective view of the vertically retractable cushion placed in the horizontal position wherein the cushion has an engaging hook for engaging a bar affixed to the adjacent door of the vehicle.
Figure 7:
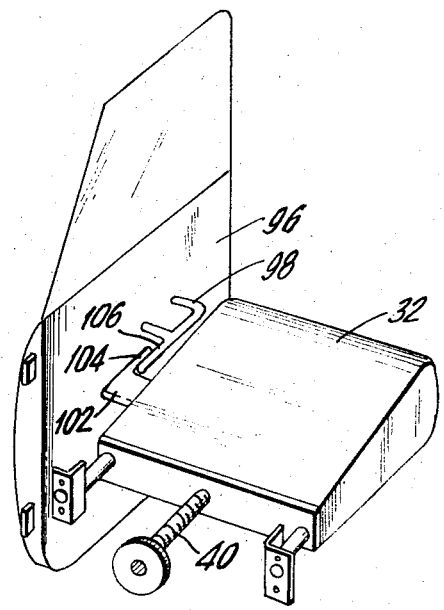
FIG. 7 is a perspective view of the cushion shown in FIG. 4 when the cushion is fully extended in the horizontal direction, this cushion being provided with means for engaging a bar affixed to the adjacent door of the vehicle.

In another feature of the invention, door locking means are provided as shown in alternate arrangements of FIG. 6 and FIG. 7. The arrangement shown in FIG. 6 relates to the embodiment in which cushion 32 retracts to the vertical position. In this arrangement, an engaging hook 94 extends from cushion 32 and is internally fastened to tubular structure 30 as shown in dotted lines. Side door 96 is shown to have a formed bar 98 fastened thereto in such a manner as to form slot 100 therebetween. When padded cushion 32 is forced downward toward the extended horizontal position, engaging hook 94 slips into slot 100 so as to lock door 96.

In the embodiment shown in FIG. 7, which relates to the cushion that retracts towards the instrument panel of the vehicle, engaging hook 94 is replaced by a plate or bar 102, which bar has an extending portion 104 and is internally fastened to frame 30. In this example, bar 98 has an extending portion 108 which is so placed that as cushion 32 reaches its extended horizontal position, portion 104 of bar 102 fits between portion 108 of bar 98 and door 96 so as to prevent door 96 from being opened.

It should also be noted that a flexible belt or strap 108 (shown in FIG. 1) can be attached to the cushion so as to allow the occupant to grasp the strap so that he may brace himself. Strap 108 can be made of a suitable fabric or leather material and can be sewn or stitched to the ends of the cushion.

The electric circuits of the ignition switch for accessory equipment and for cranking the engine are not shown as their art is well known.

It is thus seen that there is provided a motorized padded retractable cushion for protecting a passenger of a vehicle which achieves the several objects of the invention, and is well adapted to meet the conditions of practical use.

As various possible embodiments might be made of the above invention, and as various changes might be made in the embodiments set forth above, it is to be understood that all matter herein described, or shown in the accompanying drawings, is to be interpreted as illustrative and not in a limiting sense.

I claim:

1. An assembly for protecting a passenger of a motor vehicle comprising a padded cushion, means for guiding said padded cushion between an extended horizontal position immediately adjacent a passenger sitting in the motor vehicle and to a retracted position wherein said padded cushion is spaced from a passenger sitting in the motor vehicle, a reversible electric motor, said electric motor including a first terminal and a second terminal, means coupled to said electric motor and to said padded cushion so that upon said electric motor being energized said padded cushion is moved, a first limit switch, a second limit switch, an ignition switch including an ignition "off" terminal and an ingition "on" terminal, a source of electrical energy, said source of electrical energy connected to said ignition "off" terminal when said ignition switch is in the "off" position and to said ignition "on" terminal when said ignition switch is in the "on" position, means for connecting said ignition "off" terminal to said first limit switch, means for connecting said ignition "on" terminal to said second limit switch, means connecting said first limit switch to said first terminal, means connecting said second limit switch to said second terminal, and means for selectively disconnecting said ignition "on" terminal from said second limit switch and for momentarily connecting said ignition "on" terminal to said first limit switch whereby when said ignition siwtch is in the ignition "off" position and said first limit switch, is closed electrical energy is supplied to said first terminal so that said padded cushion is moved from the extended position to the retracted position and when said padded cushion is in the retracted position and said ignition switch is in the ignition "on" position with said second limit switch closed electrical energy is supplied to said second terminal so that said padded cushion moves to the extended position.

2. An assembly according to claim 1 wherein means is connected to said padded cushion for opening said first limit switch as said padded cushion moves to the retracted position.

3. An assembly according to claim 1 wherein means is connected to said padded cushion for opening said second limit switch as said padded cushion is moved to the extended position, said opening means opening said first limit switch as said padded cushion is moved to its retracted position.

4. An assembly for protecting a passenger of a motor vehicle comprising a padded cushion, said padded cushion having a first position wherein said padded cushion is immediately adjacent a passenger of the motor vehicle and a second position wherein said padded cushion is spaced from a passenger in the motor vehicle, a two directional electric motor having a first terminal and a second terminal and a shaft attached thereto, means coupling said motor shaft to said padded cushion for moving said padded cushion to its first and second position, a first limit switch, a second limit switch, an ignition switch having an ignition "on" terminal and an ignition "off" terminal, said ignition switch including a pole selectively placeable in contact with said ignition "on" terminal and said ignition "off" terminal a source of electrical energy, means coupling said pole to said source of electrical energy, said ignition "on" terminal being coupled through said second limit switch to said second terminal of said motor, said ignitionn "off" terminal being coupled through said first limit switch to said first terminal of said motor, means coupled for movement with said cushion for opening said first limit switch only when said padded cushion is moved to the second position and for opening said second limit switch only if said padded cushion is moved to the first position, whereby when the pole is in contact with the ignition "on" terminal and said padded cushion is in the second position electrical energy is supplied through said second limit switch to the second terminal of said motor so as to turn said shaft in one direction with said coupling means moving said padded cushion to the first position wherein said opening means opens said second limit switch so as to deactivate said motor, and when the pole of said ignition switch is in contact with the ignition "off" terminal and the padded cushion is in the first position electrical energy is supplied through said first limit switch to said first terminal of said motor to turn said shaft in a direction counter to the one direction so that said coupling means moves said cushion to the second position so that said opening means opens said first limit switch and deactivates said motor and a manually operated single pole switch having first and second terminals, the pole of said single pole switch being coupled to the "on" terminal of said ignition switch, the first terminal of said single pole switch being coupled to said first limit switch and the second terminal of said single pole switch being coupled to said second limit switch.

5. An assembly according to claim 4 wherein said single pole switch is spring loaded so that the pole thereof is biased to contact said second terminal of the single pole switch whereby said pole can be momentarily placed in contact with said first terminal of the single pole switch to momentarily move the padded cushion to its second position.

* * * * *